2,781,636
LOW EMISSIVITY COATINGS FOR METAL SURFACES

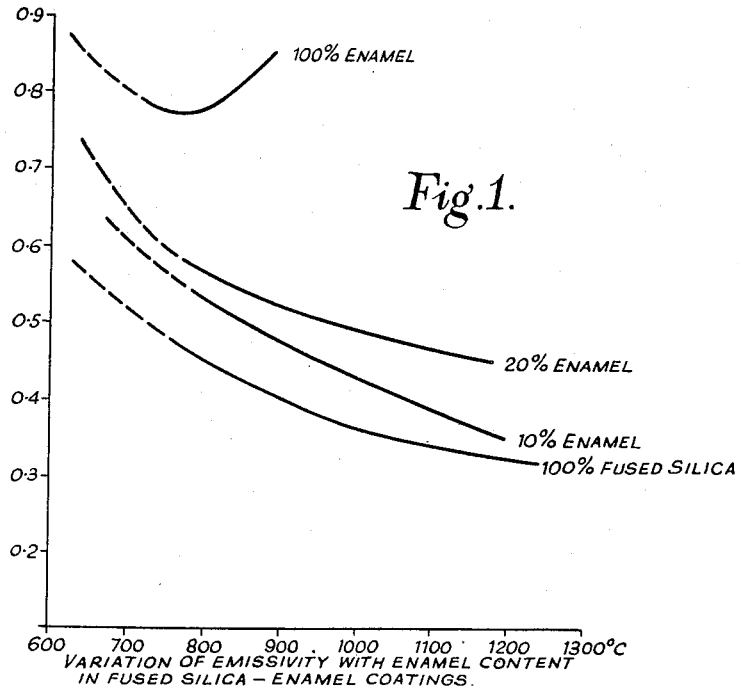
Fig. 1. Variation of emissivity with enamel content in fused silica – enamel coatings.
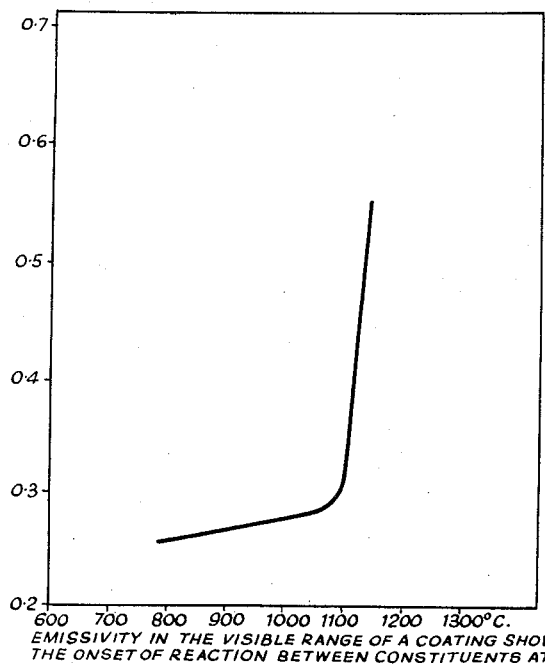
Fig. 2. Emissivity in the visible range of a coating showing the onset of reaction between constituents at 1100°C.

Eric A. Brandes, Chalfont St. Peter, and Robert B. Waterhouse, Windsor, England, assignors to Fulmer Research Institute Limited, Stoke Poges, England Application June 23, 1952, Serial No. 295,052

4 Claims. (Cl. 60—39.69)

This invention is concerned with reducing radiant heat transference to and from metal surfaces by the application to the surfaces of low emissivity coatings.

For example, in a gas turbine flame tube burning pulverised fuel, the heat source is a luminous flame and radiates heat to the surrounding flame tube wall. A low emissivity coating applied to the latter in order to reduce the transfer of this radiant heat should possess the properties of remaining adherent and of retaining its low emissivity even when subjected to protracted heating or to sudden temperature changes as may occur in service.

The present invention provides a new and improved low emissivity coating material for adherence to metal surfaces, and a method of preparing and applying it.

The said coating material comprises by weight 5–30% of enamel frit in dried and ground condition and 95 to 70% of a low emissivity refractory substance in the form of particles of from 0.1 to 0.001 mm. thickness or diameter.

The low emissivity refractory substance should have a coefficient of thermal expansion when mixed with the enamel frit approximately equal to the coefficient of thermal expansion of the metal to which the coating is to be applied. Suitable refractory substances are fused silica, stabilised zirconia, fused or recrystallised magnesia, fused or recrystallised ceria, fused or recrystallised alumina, or the mineral cordierite (approximately $2MgO_2Al_2O_35SiO_2$) or suitable mixtures of these substances. These substances must be previously powdered, or otherwise treated, so that the average particle size is not more than 0.1 mm. and not less than 0.001 mm. The composition of the enamel frit, the proportions of the frit to the refractory substance and the particle size of the refractory substance must all be chosen so that on firing at a temperature in excess of the maximum service temperature, no reaction or solution takes place which causes appreciable change in the character of the individual particles of the refractory substance and which thereby substantially reduces the effective emissivity of the coating.

We have found that the emissivity of an applied coating of the mixture decreases with increasing thickness but that the adherence of an applied coating of the mixture also decreases with increasing thickness. In order therefore to obtain the most practical compromise between low emissivity and a good adherence, the mixture is applied in practice to afford coatings of a thickness of from 0.003 inch to 0.015 inch.

The mixture can be applied to the metal as a slip or as a suspension in water and caused to adhere thereto by heating the treated metal to a temperature not exceeding the melting point of the metal and not sufficiently high to cause reaction or solution to take place such as would appreciably change the character of the individual particles of refractory and thereby substantially reduce the effective emissivity of the coating.

If required the mixture may be wetted and may incorporate a suitable binder.

We have found that when powdered refractory substance, such as fused silica, is mixed with an enamel frit, the emissivity of the mixture when applied as a coating, is greater than that of the powdered refractory substance, the increase being particularly marked when the proportion of the enamel frit is greater than 30%. By way of illustration Figure 1 of the accompanying drawing shows the variation of total emissivity with temperature of powdered fused silica alone, of enamel alone, and of mixtures of the two containing respectively 20% enamel and 10% enamel. Powdered fused silica will however not adhere to a heat resisting metal surface without being mixed with a proportion of enamel; when only 10% of enamel is incorporated, the coating can be fairly easily removed by abrasion; but with 20% enamel the coating cannot be easily rubbed off and in suitable thicknesses such as a coating will withstand quenching in water from a temperature of 1200° C.

In carrying out our invention, a suitable enamel frit may be made according to the methods well known in the art and may contain feldspar, borax and quartz. Other materials such as soda ash, fluorspar, barium oxide, calcium oxide, vanadium pentoxide or zirconia may be added. This frit is cast, dried and ground.

The refractory substance (for example, fused silica) is crushed and ground dry (for example, in a steel mill using steel balls) and reduced to particles of the order of 0.005 to 0.01 mm. diameter. The powder may be treated to remove iron (for example, in the case of fused silica, it may be treated with hydrochloric acid).

The powdered refractory substance is then milled with the prepared enamel frit, preferably in a porcelain ball mill, with an aqueous or alcoholic medium containing, if necessary, an organic binder and a wetting agent, the amount of enamel frit being approximately by weight 20 parts to 80 parts of the powdered refractory. The mixture thus obtained is ready to use as a low emissivity coating material.

Before applying it to a metal surface the latter should be prepared, for example, by shot blasting or vapour blasting following by washing in, say, acetone, followed by drying.

We have found that the application of these coatings is particularly suitable for heat resisting alloys containing chromium but, if necessary, mild steel may be surface-treated to give a higher chromium content on the surface (for example by vapour phase treatment in an atmosphere consisting of volatile halides of chromium).

The application of the coating may be by dipping, spraying or any other convenient means. The applied coating is allowed to dry and the coated article is then fired for, say, 30 minutes at 900° C.–1000° C. in an atmosphere the oxygen content of which must depend on the oxidation resistant properties of the metal. In carrying out the firing treatment it is important that the temperature should not be so high as to cause reaction or solution of the small particles of the low emissivity refractory, since if this occurs the emissivity of the coating tends to rise and is not restored when the temperature is again allowed to fall. An example of this is shown in Figure 2. This particular coating consisted of 40% $Al_2O_3$, 40% fused silica, and 20% enamel frit. From Figure 2 it can be seen that when the temperature of approximately 1100° C. is reached, reaction of the particles takes place and the emissivity rises steeply. This coating would, however, have been satisfactory if fired at a temperature not exceeding 1050° C. and if used in service below this temperature. The thickness of the coating should be from 0.003″–0.015″, the optimum thickness being 0.007″ though this may vary slightly with different coatings.

Example 1

An enamel frit was made up from 20.9% feldspar, 40.2% borax, 22.9% quartz, 5.1% soda ash, 4.8% sodium nitrate and 6.1% fluorspar (percentages by weight), being cast and dried and ground in a porcelain edge run mill.

Next, fused silica was crushed and ground dry in a steel ball mill to the specified average particle size and was treated with hydrochloric acid to remove metal particles and then dried.

Next, a medium was prepared by mixing 500 ccs. 10% solution of Carbowax 4000 polyethylene glycol with a molecular weight exceeding 1000, 500 ccs. distilled water, 10 gms. sodium chloride, and 2.5 ccs. octyl alcohol.

Finally, 20% by weight of the aforesaid enamel frit, 80% by weight of the aforesaid powdered fused silica, and the aforesaid medium in the proportion of 100–150 mls. medium to 100 gms. solid were milled in a porcelain mill to obtain a low emissivity coating material.

For a test application sheets 0.036" thick of a creep resistant nickel chromium alloy containing 20% chromium with small additions of carbon and titanium, were shot blasted and then washed in acetone to remove traces of iron from the shot blasting. After drying, the coating material was applied to the sheets by dipping and was then allowed to dry. The sheets were then put into a furnace at 900° C. and fired for between 15 and 30 minutes. The coatings were then hard and white.

*Example II*

An enamel frit was made up from, by weight, feldspar 33.8%, borax 8.9%, sodium carbonate 15.9%, sodium nitrate 4.0%, alumina 3.7%, sodium silicafluoride 4.0%, barium carbonate 10.4%, zinc oxide 8.9%, calcium carbonate 7.7%, vanadium pentoxide 2.7%. This was melted, cast into water, dried and ground in a porcelain edge run mill.

Next, pure cerium oxide was ground, great care being taken to avoid impurities.

Next, a medium was prepared exactly as in Example 1.

Finally, 20% by weight of the aforesaid enamel frit and 80%, by weight, of the aforesaid ground cerium oxide and the aforesaid medium in the proportion of 100–150 mls. medium to 100 gms. solid were milled in a porcelain mill with porcelain balls to obtain a low emissivity coating material.

*Example III*

An enamel frit was made up, melted, cast, dried and ground exactly as in Example I.

Next, 80% by weight of fused magnesium oxide of particle size less than 150 B. S. S. sieve mesh size was taken and combined with 20% by weight of the aforesaid enamel frit together with medium prepared exactly as in Example I in the proportion of 100 to 150 mls. medium to 100 gms. solid.

This was milled with porcelain balls in a porcelain mill to obtain a low emissivity coating. Note: this material must be applied within two or three hours of preparation and is preferably applied immediately after preparation.

*Example IV*

An enamel frit was made up, melted, cast, dried and ground exactly as in Example II. This frit was combined with magnesium oxide as described in Example III in the proportions of 80% by weight of magnesium oxide to 20% by weight of enamel frit and combined with medium as described in Example III. Note: the resultant coating mixture must be used within two or three hours of preparation.

In applying these coatings to various heat resisting metals the following application conditions have been found successful:

| Coating | Heat Resisting Metal | Firing Atmosphere |
| --- | --- | --- |
| Examples 1–4 | Nimonic 75 | Air. |
| Example 1 | 18% Chromium–8% Nickel Type Stainless Steel. | Commercial purity Nitrogen. |
| Examples 1–4 | Chromised Mild Steel | Air. |

Particular properties of the above described coatings were found to be:

(a) Low total emissivity. The emissivity of various coatings varied to some extent with the wave length of the emission and the most suitable coating for radiation suppression may be chosen in the light of the wave band of the radiation from the source—for example, cordierite has been found to be particularly suitable for suppressing radiation within the visible range.

(b) The coatings were stable and when held at 900° C. for 300 hours did not deteriorate.

(c) The coatings were resistant to thermal shock and when applied in thicknesses of approximately 0.1 mm. could be quenched in water from 1000° C., or higher, without flaking off.

(d) The coatings were somewhat flexible. A coating of approximately 0.1 mm. thickness was bent about 1" radius without cracking.

If desired the low emissivity coating may be applied, not directly to the metal surface, but to a metal surface which has been covered by a thin layer of a protective enamel. This mode is advantageous when the low emissivity coating is to be applied to metals, such as mild steel, which do not have a high resistance to oxidation at operating temperatures; and sometimes also with oxidation-resistant metals if the coated parts are exposed to reducing atmospheres which, in the absence of a protective undercoat, could cause deterioration of the bond between the low emissivity coating and the underlying metal.

We claim:

1. A method of preparing a coating material for a metal surface for the reduction of heat transference thereby in which a low emissivity refractory material of the group consisting of fused silica, stabilized zirconia, alumina, mineral cordierite, magnesia and ceria is prepared in the form of particles between 0.1 and 0.001 mm. size, in which 95 to 70% by weight of said prepared refractory material is milled together with 5 to 30% of an enamel frit in dried and ground condition to form a milled composition and in which an aqueous suspension containing a binder and a wetting agent is added to the milled composition in the proportion of between 100 and 150 mls. to 100 grams of solid.

2. A method of reducing the heat transference of a metal surface in which a coating is applied thereto of the coating material prepared in accordance with the method claimed in claim 1 and in which the coated metal surface is heated to a temperature sufficiently high to fuse said material to said surface but insufficiently high appreciably to change the character of the individual particles of the refractory material.

3. A gas turbine flame tube to the internal surface of which has been applied a coating material prepared according to the method claimed in claim 1.

4. A gas turbine flame tube having first and second coatings applied to the internal surface thereof, the first coating being a protective vitreous enamel layer and the second a coating material prepared according to the method claimed in claim 1.

References Cited in the file of this patent

UNITED STATES PATENTS

| 100,725 | Clark | Mar. 15, 1870 |
| 1,438,154 | Zulauf | Dec. 5, 1922 |
| 2,396,979 | Baldwin | Mar. 19, 1946 |
| 2,475,470 | Bennett et al. | July 5, 1949 |

OTHER REFERENCES

Andrews: Enamels, Twin City Printing Company (1935), pp. 238–241.

Hansen: A Manual of Porcelain Enameling (1937), page 62.

Carbowax Compounds and Polyethylene Glycols, Carbide and Carbon Chemicals Corp. (1946), pages 6 and 7.